(12) United States Patent
Furukawa (10) Patent No.: US 6,262,814 B1
(45) Date of Patent: *Jul. 17, 2001

(54) MICROFILM SCANNER AND CONTROL METHOD THEREFOR (75) Inventor: Takao Furukawa, Tokyo (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/785,258

(22) Filed: Jan. 17, 1997

(30) Foreign Application Priority Data

Jan. 17, 1996 (JP) .................... 8-022943

(51) Int. Cl.[7] .................... H04N 1/04
(52) U.S. Cl. .................... 358/487; 358/474
(58) Field of Search .................... 358/487, 496, 358/494, 488, 449, 474; 382/289, 287, 286, 199

(56) References Cited

U.S. PATENT DOCUMENTS

| 4,533,959 | * | 8/1985 | Sakurai | 358/280 |
|---|---|---|---|---|
| 4,623,935 | | 11/1986 | Mukai et al. | 358/280 |
| 4,870,500 | | 9/1989 | Nagashima | 358/443 |
| 5,072,311 | * | 12/1991 | Hiramatsu et al. | 358/487 |
| 5,204,755 | * | 4/1993 | Taga | 358/400 |
| 5,282,064 | * | 1/1994 | Yamada | 358/487 |
| 5,383,035 | * | 1/1995 | Suzuki | 358/500 |
| 5,384,621 | * | 1/1995 | Hatch et al. | 355/204 |
| 5,416,605 | * | 5/1995 | Hideshima et al. | 358/487 |
| 5,457,547 | * | 10/1995 | Yamada | 358/487 |
| 5,844,226 | * | 12/1998 | Suzuki | 235/462 |

* cited by examiner

Primary Examiner—Jerome Grant, II
(74) Attorney, Agent, or Firm—Sughrue, Mion, Zinn, Macpeak & Seas, PLLC (57) ABSTRACT There is provided a microfilm scanner which easily eliminate a search mark provided to each frame of a strip-shaped microfilm to precisely read only a range (image photographed range) including the frame. The microfilm scanner comprising: a film-edge detector for a width edge of the microfilm in each main scanning line in response to an output of a line sensor; and reading-range setter for setting an image reading range in each main scanning line by referring the detected edge of the microfilm. In a case that a width of the film is known in advance, start and end points of the image reading range may be determined from the first edge detected along a main scanning direction of the film-edge detector. A control method for the microfilm scanner is also provided.

2 Claims, 7 Drawing Sheets

MICROFILM SCANNER AND CONTROL METHOD THEREFOR

BACKGROUND OF THE INVENTION

1. Field of the Invention

The present invention relates to a microfilm scanner which searches or retrieves a target frame from a strip-shaped microfilm, reads an image in the target frame using a line sensor, and outputs data representing the read image to a CRT or a printer. The present invention also relates a control method for this microfilm scanner.

2. Description of the Prior Art

There is a known microfilm scanner, which searches or retrieves a target frame from a strip of microfilm such as a roll film and reads an image projected from the target frame using a line sensor. There is also proposed a microfilm reader which uses the above microfilm scanner in combination with an output device such as a CRT display or a printer.

The use of the line sensor to read an image makes it easier to process the image as digital image signals, to display it onto a CRT or a liquid crystal display panel, or to output it to a printer. This also makes it easier to store data representing the read image into a memory such as a magneto-optical disk or to transfer the image data to other image processor. Therefore, the read image can be widely used.

In a microfilm formed in a band, tape, ribbon or long strip shape, such as a roll film, search or retrieval marks such as blips are generally provided or recorded within a given range of an edge side. Therefore, the given range from each edge of the film is defined as a region for search marks and an image is photographed on the remaining range between both edge-side regions. Thus photographed image constitutes a frame containing an original or document image.

When reading an image in a target frame using such a microfilm scanner, it may be appreciated that the entire area except the search-mark regions scanned with high density, that is, it will be desirable to be able to read only image signals in the image photographed region with high density for use as image data to be output. It is therefore necessary to correctly discriminate a range occupied by photographed image frames from a range occupied by search marks. In the conventional microfilm scanner, however, the operation procedure such as for discriminating therebetween is made complicated.

For example, when the image photographed on the microfilm is a negative image, the background portion in each original image is blackened and white frame region surrounds each original image. When a negative image is reversed to make it a positive image, the above mentioned white frame region turns to the blackened frame region. In this specification, such portions other than the original image region in the frame are called a black frame. On the other hand, search marks or blips are typically black spots or markers on the edge of the negative-positive reversed film, one spot or marker for each frame. Therefore, the black frames and the search marks are often confused with each other. As a result, the detection accuracy of the microfilm scanner is lowered and thereby a range including the target frame may not be detected.

SUMMARY OF THE INVENTION

The present invention has been accomplished under the circumstances as aforementioned, and a first object thereof is to provide a microfilm scanner which easily eliminates search marks on a strip of microfilm so that only a range including a target frame (image photographed range) can be scanned precisely.

Also, a second object of the present invention is to provide a control method for a microfilm scanner, in which search marks on a strip of microfilm are easily eliminated so that only a range including a target frame (image photographed range) can be scanned precisely.

The first object of the present invention is attained by the provision of a microfilm scanner having a line sensor for reading an image photographed or recorded on a frame of a strip-shaped microfilm, comprising:
(a) film-edge detecting means for receiving an output of said line sensor obtained by scanning the microfilm in the main scanning direction perpendicular to the lengthwise direction of the microfilm and for detecting a width edge of the microfilm in each main scanning line; and
(b) reading-range setting means for setting a range of an image to be read in each main scanning line by referring to the detected edge of the microfilm.

The second object of the present invention is attained by the provision of a control method for a microfilm scanner, in which an image photographed or recorded on a frame of a strip-shaped microfilm is read by a line sensor, comprising steps of:
detecting a width edge of the microfilm by using an output of the line sensor; and
setting a range of an image to be read in each main scanning line by referring to the detected edge.

If a width of the microfilm is known in advance, start and end points of the image reading range can be set by referring to the first-detected film edge in the main scanning direction of the line sensor.

Among from outputs of the line sensor, which have been used for detecting the edges of the film, only image signals contained in the image reading range are selected so that the image in the image reading range represented by the selected image signals can be used as an output image. Alternatively, the line sensor may perform two types of scanning; the one is first or preliminary scanning for detecting width edges of the film, and the other is second or real scanning.

After the image reading range is set through the preliminary scanning with low density, the second or real scanning may be performed with high density. Image signals contained in the image reading range set by preliminary scanning are selected from the entire image signals obtained by the second scanning operation. With such a operation, an image represented by the selected image signals can be read for use as an output image.

The line sensor may perform preliminary scanning for detecting a black frame of a target frame and its inclination angle, then may perform real scanning for reading the original image with high density. In such a case, the line sensor can scan the entire range (image reading range) except the search mark region by referring to the edges of the film, during the preliminarily scanning, before the black frame and its inclination angle are detected.

Figure 6:
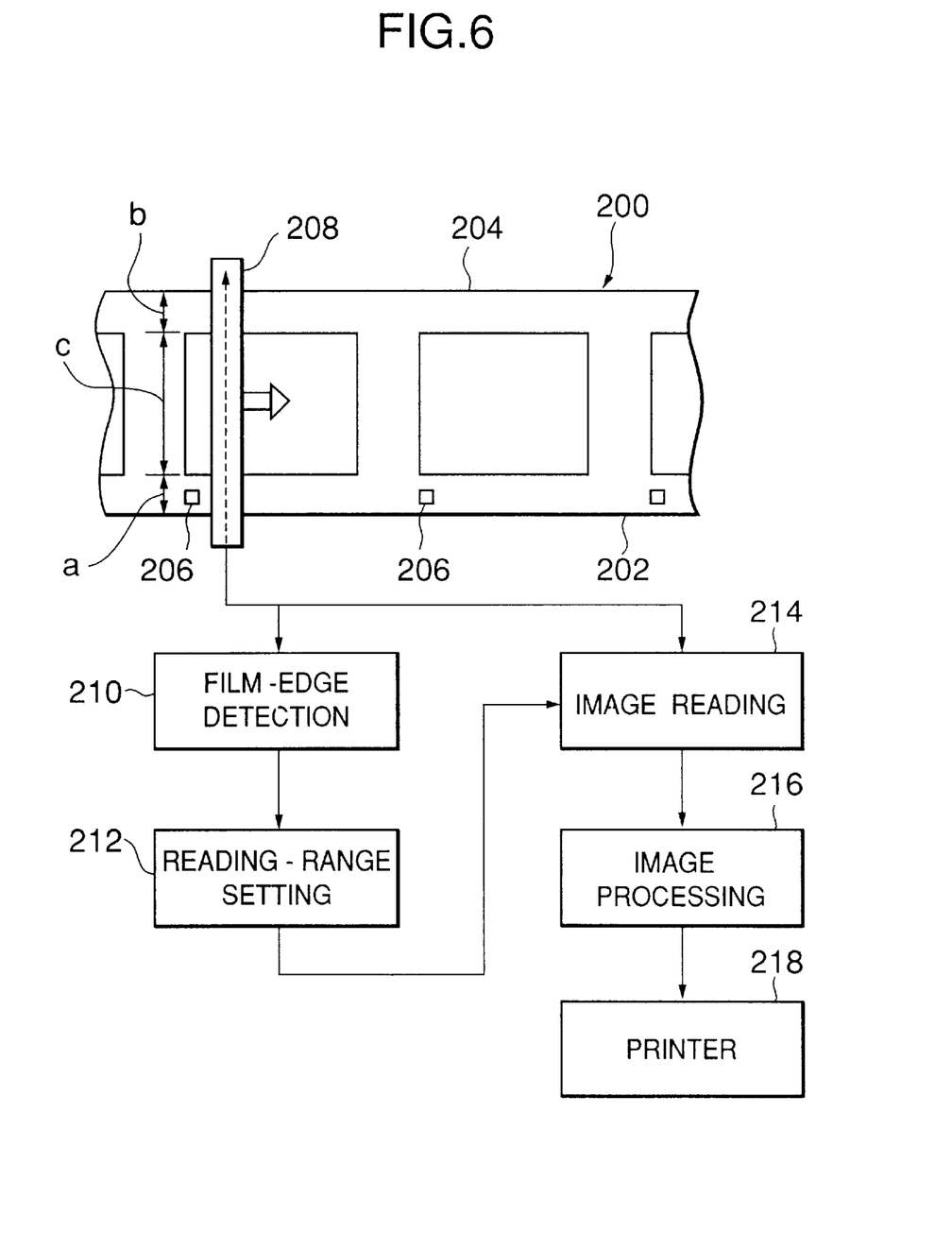
FIG. 6 is a diagram explaining an flow of operation according to the present invention.
Figure 7:
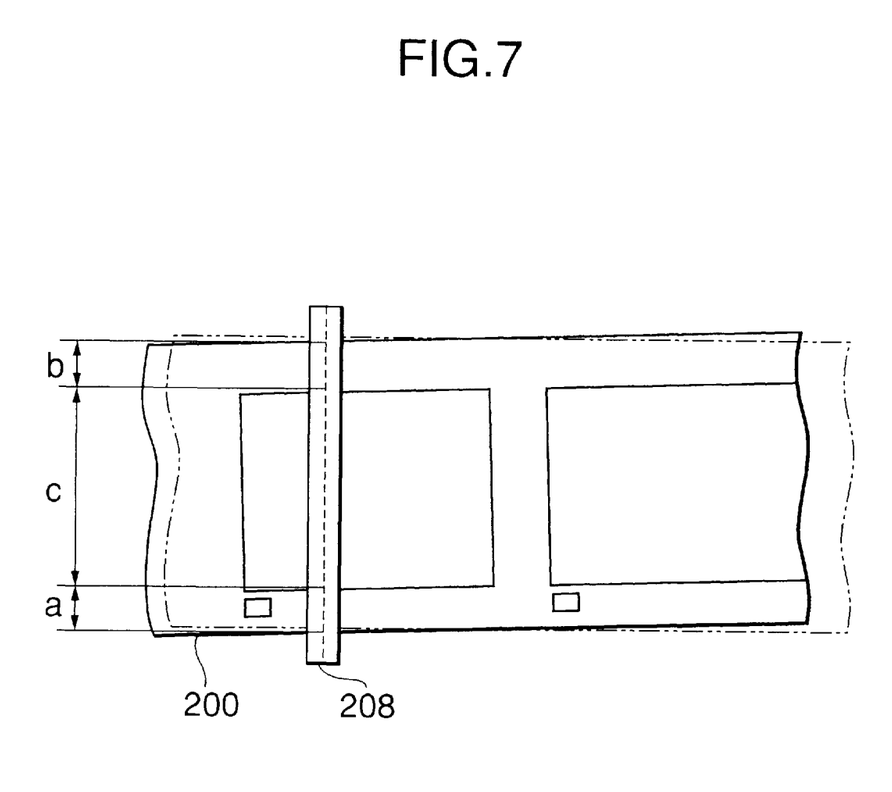
FIG. 7 is a diagram explaining the outline of the present invention.

Referring now to FIGS. 6 and 7, an outline of the present invention will be described. In FIG. 6, there is shown a portion of a roll of microfilm 200. In the film 200, each of given ranges a, b from both edges 202, 204 has been set to be a region where a search mark or blip 206 should be provided to each frame. Accordingly, an image in each frame has been photographed in a range c between the ranges a and b. The range c is thus set to be an image photographed range including an image in each frame.

Although a line sensor 208 is to read a enlarged image projected from the film 200, it is conceptually or schematically illustrated over the film 200 in FIG. 6 for easy understanding of the present invention. The line sensor 208 is arranged in a direction substantially perpendicular to a length-wise direction of the film 200 to relatively move in the length-wise direction of the film 200 (a direction indicated by an arrow in FIG. 6).

The line sensor 208 scans or reads an image in a main scanning direction, for example, from the lower side to the upper side in FIG. 6. Outputs of the line sensor 208 are supplied to film-edge detecting means 210 in which the first edge 202 of the film 200 is detected. After detecting the first edge 202, reading-range setting means 212 determines coordinates of an end point of the range a, where the blip 206 has been provided to each frame, and coordinates of an end point of the image photographed range c. In other words, the reading-range setting means 212 determines coordinates of the start and end points of the image photographed range (image reading range) c.

The outputs of the line sensor 208 are also supplied to image reading means 214. In the image reading means 214, image signals in the reading range c determined by the reading-range setting means 212 are selected from among the outputs of the line sensor 208 so that only an image represented by the selected image signals can be read. Therefore, it permits the line sensor 208 to scan the entire image range c except a region where the blip 206 has been provided to each frame.

The read image is processed in appropriate image processing by image processing means 216 and output to an output device such as a printer 218. It should be noted that the image signals obtained from the image area c and input to the image processing means 216 contain both an original image in a target frame and a black frame surrounding the original image. It is therefore preferable to detect and erase the black frame, or to detect and correct an inclination angle of the target frame.

When reading images, the film 200 is fixed between panels of glass. However, the film 200 is fed with any play in the width-wise direction and thereby the fixed position of the film 200 somewhat changes. For example, it may move up and down or is tilted at an angle.

In FIG. 7, the solid line indicates that the film 200 is slightly tilted while the virtual line or double-dot-and-dash line indicates that the film 200 is put in a correct position. Even if the film 200 is tilted as shown by the solid line in FIG. 7, the line sensor 208 can determine an image reading range c in each main scanning line by referring to the edge 202 independently of the inclination angle of the film 200.

BRIEF DESCRIPTION OF THE DRAWINGS

The above and other objects and advantages and further description will now be discussed in connection with the drawings, in which.

DETAILED DESCRIPTION OF THE PREFERRED EMBODIMENTS

A preferred embodiment will be described below with reference to the drawings.

Figure 1:
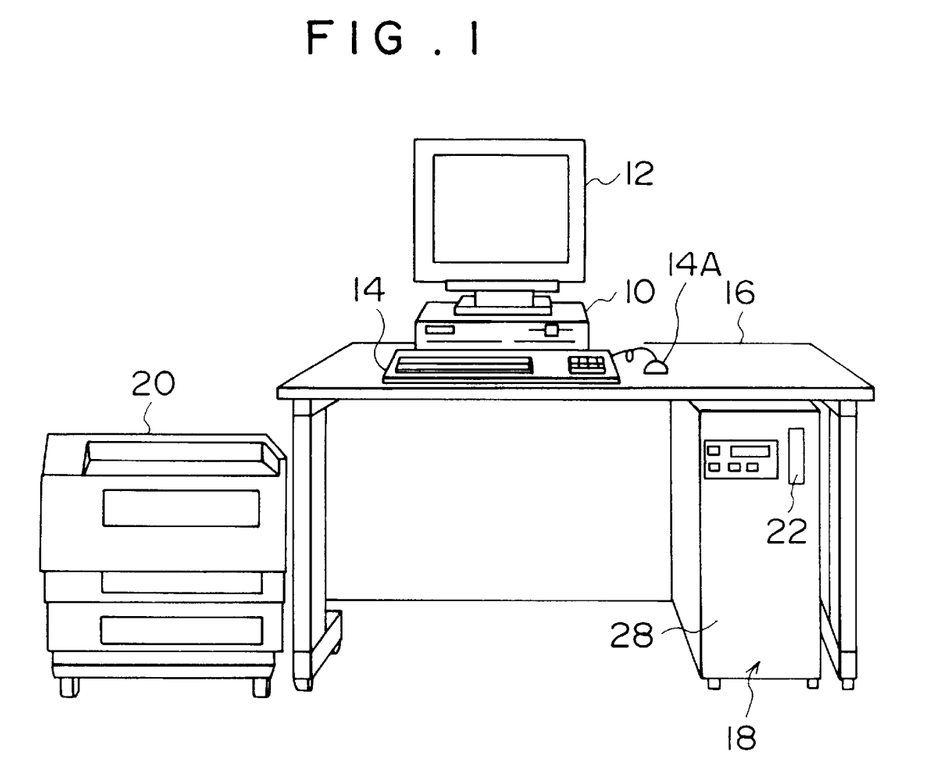
FIG. 1 is a diagram showing an image reading and processing apparatus which incorporates a microfilm scanner of an embodiment according to the invention.

Referring now to FIG. 1, there is shown a computer body 10, a display device 12 such as a CRT or a liquid crystal display panel, a keyboard 14 used for user's manual operation, a scanner 18, and a printer 20. The display device 12 and the keyboard 14 are put on a desk 16, the scanner 18 is put under the desk 16 and a printer 20 is placed at the side of the desk 16.

The scanner 18 has a cartridge loading port 22 in the upper portion of the front panel, and serves to read an image on a microfilm 26 with low density (preliminary scanning), the microfilm 26 being contained in a cartridge 24 (see FIGS. 2 and 3) which has been inserted into the cartridge loading port 22. During the preliminary scanning, the first edge of the film 26 are detected, as previously described, to determine an image reading area c (see FIGS. 6 and 7) by referring to the detected edge. Therefore, the scanner 18 reads only the image in the image reading range c. The read image with low density is processed in predetermined image processing by a CPU or the like incorporated in the scanner 18. The processed image is then displayed on the display device 12.

After checking the low-density image on the display device 12, if it is required to output the image data to the printer 20, the scanner 18 reads the image in this frame with high density (real scanning). After the real scanning, a black frame region is erased from the read image of high density while an inclination of the original image in this frame is corrected, as described in detail later. The read image is then processed in predetermined image processing and output to the printer 20, stored in a memory such as a magneto-optical disk, or transferred to other external processor.

The inner arrangement of the scanner 18 will now be described. The scanner 18 has a longitudinal cabinet 28, in which a feed reel driving unit 30 and a take-up reel driving unit 32 are arranged in the upper front portion and the lower front portion, respectively. When the cartridge 24 is inserted into the cartridge loading port 22, the feed reel driving unit 30 moves the cartridge 24 automatically and engages a reel 24A with a rotating shaft of the feed reel driving unit 30. Then, the feed reel driving unit 30 pulls out the head lead of the roll film 26 from the cartridge 24 and feeds it downward to guide it to a take-up reel 32A in the take-up reel driving unit 32.

Figure 2:
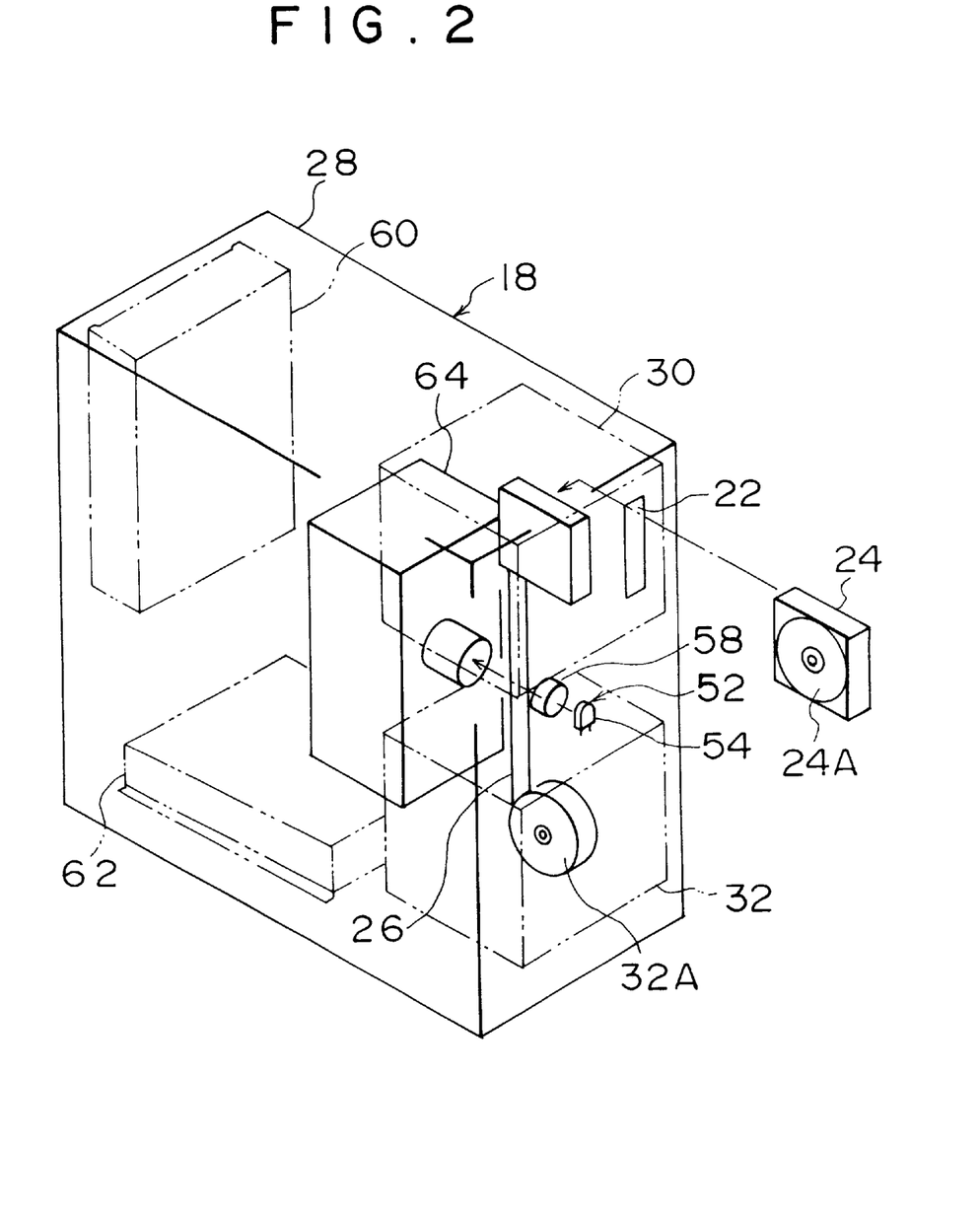
FIG. 2 is a perspective view illustrating the interior of a scanner used in the embodiment of FIG. 1.
Figure 3:
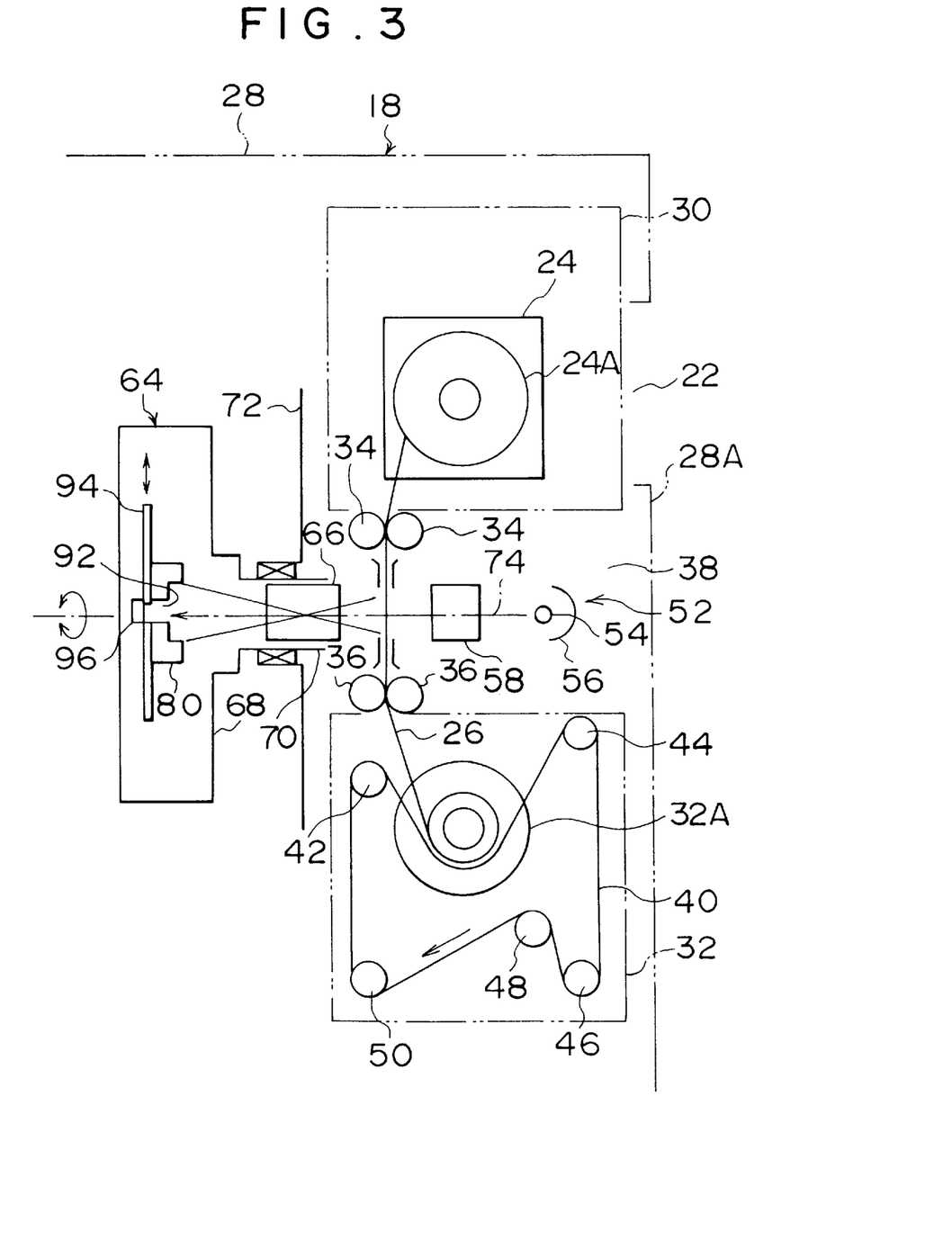
FIG. 3 is a side view illustrating an arrangement of main parts of the scanner in FIGS. 1 and 2.

When viewing the scanner 18 in FIGS. 2 and 3, the film 26 passes through the rear side of the empty space between the reel driving units 30, 32, that is, the film 26 passes through at the inner back side viewed from the front of the cabinet 28. Referring to FIG. 3, there are shown guide rollers 34, 34, 36 and 36 for guiding the film 26. Accordingly, a space 38 is formed by a gap between the reel driving units 30, 32 and a front panel 28A of the cabinet 28, and a light source 52, described later, is housed in this space.

The take-up reel driving unit 32 has a drive belt 40 which runs in contact with the reel 32A as shown in FIG. 3. The drive belt 40 is wound around guide rollers 42 and 44, a driving roller 46, an encoder 48 and a tension roller 50, and it is driven by the driving roller 46 to run in a film take-up direction (indicated by an arrow in FIG. 3).

The light source 52 is housed in the space 38 between the above-described two reel driving units 30 and 32, which includes a lamp 54, a reflector 56, a condenser lens 58, and an appropriate filter. In FIG. 2, there are illustrated a power supply circuit 60 and a power control circuit 62 for controlling an actuator such as a motor.

Figure 4:
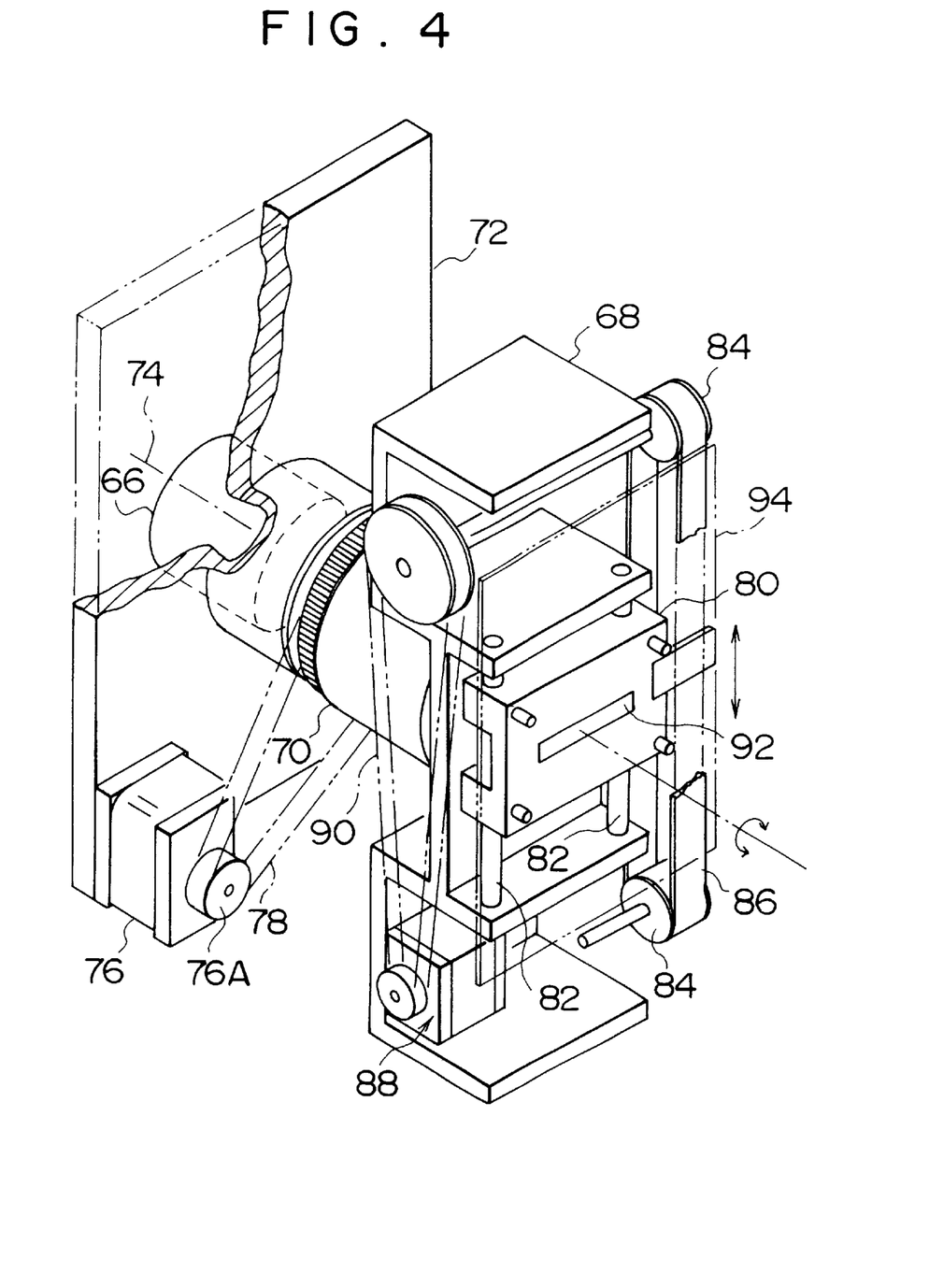
FIG. 4 is a perspective view illustrating a line sensor driving unit of the scanner in FIG. 3.

A line sensor driving unit 64 will next be described. The line sensor driving unit 64 is integrated with a projection lens 66. More specifically, as shown in FIGS. 3 and 4, a cylindrical section 70 for holding the projection lens 66 is integrally formed with a frame (rotatable frame) 68 of the line sensor driving unit 64. The projection lens 66 mounted in the cylindrical section 70 is a fixed focus lens with a magnifying power of approx. 2. The cylindrical section 70 is held rotatably in a frame (fixed frame) 72 fixed to the cabinet 28 so that an inclination of an image to be read can be corrected. Thus, the cylindrical section 70 rotates along a light axis 74 perpendicular to the surface of the film 26.

A belt 78 is wound around the cylindrical section 70 and a pulley 76A of a servo motor 76 mounted on the fixed frame 72. Therefore, the rotary frame 68 can be rotated around the light axis 74 by the rotation of the motor 76.

On the rotary frame 68, a movable plate 80 is provided on the side opposite to the cylindrical section 70 as shown in FIG. 4. In details, the movable plate 80 is slidably held by a pair of guide rods 82, 82 to permit the movable plate 80 to reciprocate, along a plane which perpendicularly intersects to the optical axis 74, around the opening of the cylindrical section 70.

In the rotary frame 68, a belt 86 wound around pulleys 84, 84 is provided in a direction parallel to the up-and-down moving direction of the movable plate 80, and one side of the movable plate 80 is fixed to the belt 86. To one pulley 84, the rotation of the servo motor 88 is transmitted through a belt 90. As a result, the movable plate 80 can be moved up and down on a plane perpendicular to the light axis 74 by rotating the servo motor 88 in a forward or inverse direction.

On the movable plate 80, an elongated window (narrow slit) 92 is formed in a direction perpendicular to the guide rods 82, 82, that is, perpendicular to the up-and-down moving direction of the movable plate 80. The elongated window 92 has its longitudinal center through which the light axis 74 passes. In the rear side of the movable plate 80, that is, in the side opposite to the cylindrical section 70, a printed circuit board 94 is fixed perpendicularly to the light axis 74.

A longitudinal CCD arrayed line sensor 96 is fixed to the printed circuit board 94 to face the window 92 (FIG. 3). A preamplifier for amplifying an output of the line sensor 96 is also mounted on the printed circuit board 94. The position of the light-receiving surface of the CCD line sensor 96 must correspond to a plane on which a projected image from the projection lens 66 is focused.

Figure 5:
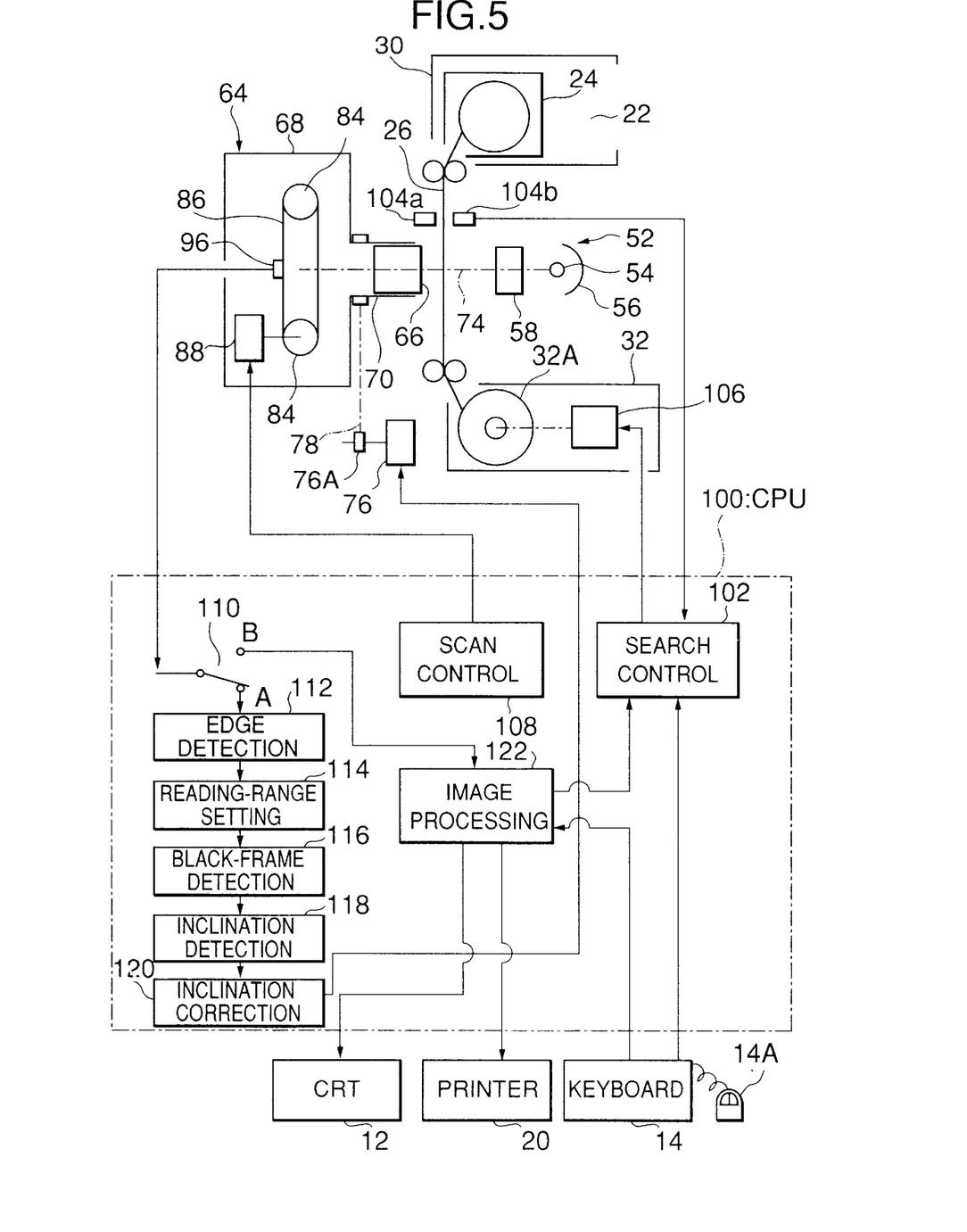
FIG. 5 is a schematic block diagram illustrating a control system of the scanner.

The CPU 100 incorporated in the scanner 18 serves as a controller for controlling the whole operation of the scanner 18 and has various functions as shown in FIG. 5. Although these functions are provided by software, FIG. 5 shows them by using block diagram for convenience sake.

In FIG. 5, a search control means 102 detects a target frame from the film 26 by using a search blip mark (labeled by reference numeral 206 in FIG. 6) which is previously provided to each frame of the film 26. Specifically, a pair of blip sensors consisting of a light-emitting element 104a and a light-receiving element 104b are arranged on both sides through a running path of the film 26 for counting outputs of the blip sensor 104b. While counting the outputs of the blip sensor 104b, the target frame is discriminated by controlling a motor 106 of the take-up reel driving unit 32 and a motor (not shown) of the feed reel driving unit 30.

A scan control means 108 outputs an operating signal to actuate the line sensor driving unit 64 when the target frame comes in at a predetermined position within a projection range including the optical axis 74. More specifically, the motor 88 is actuated to move the line sensor 96 in parallel on the image-focused plane for reading or scanning the projected image.

The line sensor 96 moves at a high speed when reading the image with low density for displaying it on the CRT display device 12 (low-density real scanning), whereas it moves at a low speed when reading the image of high density for outputting it to the printer 20 (high-density real scanning). The lamp 54 of the light source 52 is turned on only at a scanning time. It is therefore possible to save the power.

When using a halogen lamp as the lamp 54, it takes about 100 msec to make the intensity of the halogen lamp stable after turning on the lamp 54. It is therefore necessary to turn on the lamp 54 about 150 msec before the scanning is started. However, an electric current with the strength of 1/3 may be applied to the lamp 54 even at a non-scanning time to make the intensity of the lamp 54 stable more quickly.

As shown in FIG. 5, a circuit changing switch 110 is used for connection to Side A at the first or preliminary scanning and for connection to Side B at the second or real scanning. An edge detecting means 112 detects the first edge 202 (see FIG. 6) of the film 26 during the main scanning by the line sensor 96. A reading-range setting means 114 sets a reading range c (see FIGS. 6 and 7) by referring to the detected edge 202. A black-frame detecting means 116 detects a black frame from output signals representing the reading range c to be read by the line sensor 96.

This black frame is a peripheral portion of an original, that is, a portion which appears in the external area of the original image when printed. There are various known types of algorithm for detecting the black frame. For example, when the scanning line runs from black frame to an original image area, a predetermined number or more contiguous black pixels turns to a series of continuous white pixels on the scanning line, so that a boundary between a black frame and an original image can be detected.

After the black frame is detected, an inclination detecting means 114 detects or determines an inclination angle of the projected and read image of the original by detecting the inclination angle of the image frame of the rectangular projected image. An inclination correcting means 120 actuates a motor 76 to correct the inclination of the image frame. As a result, the entire line sensor driving unit 64 rotates to set the line sensor 96 parallel to one side of the projected image.

When the circuit changing switch 110 is connected to Side B for the main or real scanning, an image processing means 122 receives outputs of the line sensor 96 and performs predetermined or desired image processing.

The real scanning contains two types of scanning; the one is to read an image with low density for displaying it on the CRT, and the other is to read an image in a target frame with high density for printing it out. The line sensor 96 performs the real scanning of the image to be displayed faster than the real scanning of the image to be printed out.

As mentioned above, the image processing means 122 performs predetermined image processing such as image enhancement, image inversion, image expansion or reduction, spatial filtering, trimming, or masking. The image data processed by the image processing means 122 is displayed on the CRT display device 12.

While viewing the image on the CRT display device 12, the user or operator can instruct the image processing means 122 to print out the currently-displayed image. In accordance with the instructions from the operator, the image processing means 122 actuates the scan control means 108 to read the image with high density (main or real scanning). The read image of high density is processed in predetermined image processing and the processed image data is printed out. When the line sensor 96 is used for the real scanning, the image processing means 122 serves as an image reading means according to the present invention.

In reading the image, the moving speed of the line sensor 96 in the subsidiary scanning direction may be changed according to the magnification ratio. When the magnification ratio is set higher than a reference magnification, for example, where all pixels of the line sensor 96 can be output without intermittently deleting nor interpolating, the moving or feeding speed of the line sensor 96 is lowered. On the other hand, when the magnification ratio is set lower than the reference magnification, the feeding speed of the line sensor 96 is made higher. It should be noted that the feeding speed of the line sensor 96 is in inverse proportion to the ratio of the set magnification (scale factor) to the reference magnification.

The light exposure may be controlled or adjusted automatically such that the output level of the line sensor 96 falls into a predetermined range during the preliminary scanning or real scanning. In this case, storage time for which each pixel of the CCD line sensor 96 stores a data piece representative of a corresponding portion of the read image is changed by changing the frequency of the clock signal applied to the line sensor 96 so that the amount of light reception can be controlled. It is also possible to change the amount of light reception of the line sensor 96 by changing light intensity of the lamp 54 of the light source 52.

Operation procedures of this embodiment are now described. When the cartridge 24 is inserted into the cartridge loading port 22 and loaded in the feed reel driving unit 30, a head lead of the film 26 is pulled out downward. The head lead of the film 26 is guided to the take-up reel driving unit 32 by the guide rollers 34, 34, 36, 36. Then, the head lead of the film 26 is put between the reel 32A and the drive belt 40 and wound on the reel 32A.

The CPU 100 executes preliminary processing prior to real scanning, including target-frame retrieval, preliminary scanning, and inclination-angle correction. A search-blip mark is provided to each frame of the film 26 in advance, and the blip is detected by the blip sensor 104b (FIG. 5) such as a phototransistor while the film 26 is running.

The frame of a retrieval or search target is discriminated by counting blips in the search means 102. When a target frame is detected, it is positioned within a projection range (frame) including the light axis 74 and feeding of the film 26 is stopped. Then, reading an image of this frame (preliminary scanning) and preliminary processing are started.

In this first image reading, the edges of the film 26 are detected to determine the image reading range c, as previously described with reference to FIGS. 6 and 7. The line sensor 96 then scans the image reading range c. This scanning is performed as preliminary processing to determine an inclination of the read image or for automatic exposure control, and therefore it is referred to as preliminary scanning.

In this preliminary scanning, the scan control means 108 changes the circuit changing switch 110 to Side A to turn on the lamp 54 of the light source 52. Consequently, an image in the target frame is expanded approximately two-fold by the projection lens 66 and projected on the movable plate 80.

The movable plate 80 is driven by the motor 88 such that the line sensor 96 moves from one side to the other side of the entire projection range of the projected image. During this moving operation, the line sensor 96 reads the projected image on the image-formed plane. While the line sensor 96 performs this scanning (preliminary scanning), outputs of the line sensor 96 are amplified by the preamplifier disposed on the circuit board 94 and sent to the CPU 100 incorporated in the scanner 18.

The CPU 100 uses image signals derived from the line sensor 96 during this preliminary scanning to perform automatic exposure (AE) control or adjustment in a light-exposure control means. For example, if the output levels of the image signals exceed a predetermined setting range, the clock frequency of the line sensor 96 will be raised to reduce the storage time of each pixel of the line sensor 96, thereby reducing the amount of light reception. Otherwise, the clock frequency of the line sensor 96 is lowered so as to increase the amount of incident light.

The CPU 100 then makes correction for eliminating the effect of uneven or different characteristics of pixels of the line sensor 96 (CCD pixel correction). In other words, uneven output levels of respective pixels are prestored or memorized in advance, so that the CPU 100 corrects the output level of each pixel when reading the projected image.

The edge detecting means 112 determines an edge of the film 26 in response to the image signals the output levels of which have been corrected in a manner previously described. The reading-range setting means 114 sets the reading range c by referring to the detected edge of the film 26. The black frame detecting means 116 detects or determines a black frame region surrounding the original image region which is included in a projected and read image within the reading range c. The inclination detecting means 118 then determines an inclination angle of the projected image from the black frame.

The inclination angle can be determined by detecting the rectangular black frame which appears in a circumference of the original image. After determining the inclination angle of the projected image, the rotary frame 68 is rotated by the servo motor 88 so that the inclination angle becomes zero. In other words, a side in the length-wise direction of the line sensor 96 is matched with a side of the black frame.

After end operation of the preliminary processing discussed above, real scanning is performed. The above preliminary scanning operations are preliminary for frame retrieval or matching between the inclination of the projected image and the inclination of the line sensor 96. Therefore, the real and main scanning for reading the original image to be printed out is performed after the preliminary scanning.

The real scanning contains two types of scanning; the one is to read an image with low density for displaying it on the CRT (real scanning for display), and the other is to read an image with high density for printing it out (real scanning for printing). It should be noted that both real scanning operations are not basically different from each other except in the scanning speed.

In this real scanning, the circuit changing switch 110 is changed to Side B (FIG. 5). The line sensor 96 determines a scanning speed for reading the image with low density enough to display the read image on the CRT. This scanning speed is also set to corresponds to the set magnification ratio.

Then, the line sensor 96 is moved at the scanning speed to read or scan the original image with the low density.

The image read by the line sensor 96 is output to the image processing means 122 (FIG. 5) and processed in predetermined processing. In this image processing, the image processing means 122 performs predetermined or desired image processing such as output level correction for correcting uneven output levels of pixels of the line sensor 96, image expansion or reduction, image inversion, negative-positive inversion, image enhancement with an unsharped masking (USM) technique, or processing for binarization, dithering or multinarization. After end operation of the predetermined image processing, the processed image is displayed on the CRT display device 12.

While viewing the image on the CRT display device 12, if the user or operator wishes to print out the image, he or she can give printing instructions using a manual operation means such as a keyboard 14 or a mouse 14A so that the printer 20 will start printing.

In accordance with the printing instructions from the operator, the image processing means 122 sends a command to the scan control means 108 so that the image in the currently-displayed frame will be read with high density. The read image is then processed and printed out.

In a conventional microfilm scanner or projector, the light source 52 and the projection lens 66 are usually arranged in the horizontally-reverse direction to those of the embodiment shown in FIG. 3. Accordingly, if a microfilm such as used for a conventional device is used in this embodiment, the projected image will be reversed to be mirror image. In such a case, it can be electrically converted to a correct image through an appropriate image processing and this kind of processing is easy.

Also, when the film 26 used in the embodiment is a negative film, the projected image to be read by the line sensor 96 is a negative image. If such a negative image is displayed on the CRT display device 12 without performing any image processing, it will exhibit reverse black-and-white (light-and-shade) tones. In such a case, the most significant bit and the least significant bit in the black-and-white tone data are replaced with each other, then subsequent bits are exchanged in due order. Accordingly, the polarity of the read image can be reversed to be positive image.

Further, when a binary (black and white) density image needs to be output to the printer 20, a multi-valued density or multi-tone image output from the line sensor 96 may be binarized by referring to a predetermined threshold value, then each bit of the binarized image is changed between a logical 1 and a logical 0. Thus, the multi-tone image photographed or recorded on a negative film can be displayed or printed as a binarized positive image.

In this embodiment, since the line sensor 96 performs the real scanning after the preliminary scanning, an image in a target frame must be scanned by the line sensor 96 plural times. To reduce the processing time, the line sensor 96 may perform the preliminary scanning in a direction and the real scanning in a reverse direction to that of the preliminary scanning. With such arrangement, the line sensor 96 does not needs to be returned to the home position as it scans one line, and this permits the line sensor 96 to read an image continuously.

If only a subsidiary or vertical scanning direction (moving direction) of the line sensor 96 is reversed with a fixed main scanning direction, the scanned image will be reversed to be mirror image. In such a case, it can be specularly converted to a correct image through an appropriate image processing. In printing out an image onto a given paper, it may be desirable to change the orientation of the image according to the aspect ratio of the frame determined from the detected black frame region. In this case, it is preferable to input image data to a memory while rotating the image 90 deg each time the line sensor 96 reads the image.

In the conventional, two image memories are provided for writing image data from one memory to the other memory while rotating the image data 90 deg, and therefore a problem arises that a large storage capacity is required and thereby the processing time increases. Accordingly, if an output of the line sensor 96 is directly written to a memory while rotating it 90 deg, as discussed above, a required storage capacity of the memory will be reduced to about one-half the storage capacity in the conventional to decrease the processing time by several 100 $\mu$sec.

Although the projection lens 66 of the scanner is a fixed focus lens in the above embodiment, the present invention is not limited by the embodiment. For example, an automatic focus mechanism may be provided in the scanner. In this case, the automatic focusing processing can be performed as one of preliminary processing.

The display device 12 is also not limited by the CRT display device, and other display device may be used instead of the CRT display device, such as a liquid crystal panel or a plasma display. Similarly, the output device is not limited by the printer 20. For example, images read and processed by the microfilm scanner according to the present invention may be output to an external memory such as a magneto-optical disk or transferred to other image processor.

In the embodiment, if the lamp 54 is turned on only when the line sensor 96 performs scanning, it will reduce the amount of heating of the lamp 54 as well as the power consumption. Accordingly, a cooling system of the lamp 54 can be simplified. The lamp 54 may be turned on by loading the cartridge 24 into the scanner 18 and turned off by pulling out the cartridge 25 from the scanner 18.

As described in detail above, according to the present invention, the line sensor detects an edge of the microfilm and sets an image reading range in each main scanning line by referring to the detected edge. Therefore, even if a search mark such as a blip is provided to each frame of the microfilm, it can not affect the scanning operation and permits the line sensor to read or scan the entire correct image except the mark.

The image reading range can be set by referring to the first edge detected along the main scanning direction of the line sensor, that is, it can be set to a given range starting from a point at a predetermined distance away from the first edge detected along the main scanning direction. If the image area is detected by preliminary scanning, a black frame of the original image in each frame and an inclination angle of the black frame can be detected from the image reading range determined by referring to the first-detected edge to correct the inclination angle of the projected image prior to real scanning.

What is claimed is:

1. A microfilm scanner comprising:
   a line sensor for reading an original image photographed or recorded on a frame of strip-shaped microfilm;
   film-edge detecting means for receiving an output signal of said line sensor obtained by a first scanning of the microfilm in a main scanning direction perpendicular to a lengthwise direction of the microfilm and for detecting a width edge of the microfilm in each main scanning line;

reading-range setting means for setting an image reading range of an image to be read in each main scanning line based on the detected edge of the microfilm by setting the image reading range to a predetermined range starting from a point at a predetermined distance from the detected edge in the main scanning direction, said image reading range corresponding to an area of said image;

black-frame detecting means for selectively receiving image signals within the set image reading range in each main scanning line, from image signals obtained from said first scanning by said line sensor, to read an image represented by the selectively received image signals as an image in a target frame of the microfilm, and for detecting a region of a black frame, which appears in a circumference of the original image recorded in the frame, from the read image;

inclination detecting means for detecting or determining an inclination angle of the original image by detecting an inclination angle of a rectangular image frame of the original image surrounded with the black frame;

inclination correcting means for correcting the inclination of the original image with respect to said line sensor; and image reading means for reading the original image, the inclination of which has been corrected, through a second scanning of said line sensor so that only the original image in the target frame is read as an output image data.

2. A control method for a microfilm scanner comprising a line sensor for reading an original image photographed or recorded on a frame of a strip-shaped microfilm, the method comprising steps of:

scanning the microfilm in a main scanning direction perpendicular to a lengthwise direction of the microfilm to detect a width edge of the microfilm based on an output signal of the line sensor;

setting an image reading range of an image to be read in each main scanning line based on the detected edge by setting the image reading range to a predetermined range starting from a point at a predetermined distance away from the detected edge in the main scanning direction, said image reading range corresponding to an area of said image;

reading an image within said image reading range;

detecting a region of a black frame surrounding the original image from the read image;

determining an inclination angle of the original image by detecting an inclination angle of the rectangular image frame of the original image in the black frame;

correcting the inclination of the original image with respect to said line sensor; and scanning the microfilm of the line sensor to read the original image.

* * * * *